Patented Jan. 14, 1930

1,743,636

UNITED STATES PATENT OFFICE

SAMUEL LEWIS SUMMERS, OF FORT WASHINGTON, PENNSYLVANIA

METHYLENE-DISALICYLIC ACID DERIVATIVE

No Drawing.  Application filed December 8, 1928. Serial No. 324,804.

My invention relates to organic compounds and their manufacture and is especially concerned with an iodination product of methylene-disalicylamide. This substance is useful for pharmaceutical purposes as hereinafter indicated.

The first main step is to convert methylene-disalicylic acid into one of its esters. As the alcohol is removed in the next step the particular nature of the alcohol is of little consequence. One way of esterifying this acid is as follows, though I do not limit myself to this particular method:

Dissolve 288 pounds of methylene-disalicylic acid in 150 pounds of ethyl alcohol and slowly add to this solution, while keeping the temperature at 70° C., a mixture of 60 parts of 66° Bé. sulphuric acid and 40 parts of water. When all has been added, heat for two hours under a reflux condenser to 150° C. The product is freed from sulphuric acid by washing with water. The essential product is the diethyl ester of methylene-disalicylic acid:

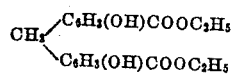

This is a creamy white powder, soluble in alcohol and insoluble in water.

The second main step is to convert this ester into the amide. One method of doing this is as follows:

Mix 344 parts of the diethyl ester (or an equivalent amount of some other ester) of methylene-disalicylic acid with 150 parts of strong ammonia (26%) and heat the mixture in an autoclave at 110° C. for 8 hours. The essential product is methylene-disalicylamide:

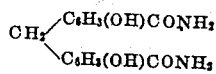

This is purified by washing with water, in which it is insoluble. It is a cream colored powder soluble in alcohol.

The third main step is to iodinate this methylene-disalicylamide. A practical way (to which I do not limit myself) for accomplishing this is to dissolve 286 parts of the methylene-disalicylamide in 286 parts of 26% aqueous ammonia and add to this solution a solution of 254 parts of iodine and 381 parts of potassium iodide in 500 parts of water. After the reaction is complete, an acid (sulphuric or other strong acid) is added to decompose the partly dissolved and partly precipitated alkaline salts. This sets free the iodinated methylene-disalicylamide, which separates as an amorphous precipitate. This is filtered off, washed with water to free it from acid and soluble salts, and dried. The empirical formula for complete iodination is $C_{15}H_{12}O_4N_2I_2$, and the structural formula is thought to be:

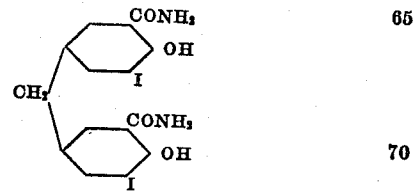

However, it will be understood that iodination may involve only one ring of the methylene-disalicylamide. This new product is practically tasteless, insoluble in water, and only slightly soluble in alcohol. It is useful as an antiseptic, antineuralgic, antiarthritic, antirheumatic and dicongestive. The dose for an adult may be from 90 to 120 grains per day.

Having thus described my invention, I claim:

1. The herein described iodine substitution product of methylene-disalicylamide having one or two nuclear hydrogens replaced by iodine, insoluble in water and slightly soluble in alcohol.

2. The herein described iodine substitution product of methylene-disalicylamide, having the empirical formula $C_{15}H_{12}O_4N_2I_2$, insoluble in water, and slightly soluble in alcohol.

In testimony whereof, I have hereunto signed my name at Ambler, Pennsylvania this 4th day of December, 1928.

SAMUEL LEWIS SUMMERS.